United States Patent [19]

Commander et al.

[11] 4,068,269

[45] Jan. 10, 1978

[54] POSITIONING SYSTEM FOR DATA STORAGE APPARATUS AND RECORD MEDIUM FOR USE THEREWITH

[75] Inventors: Robert Duncan Commander; John Richard Taylor, both of Eastleigh, England

[73] Assignee: International Business Machines Corporation, Armonk, N.Y.

[21] Appl. No.: 681,656

[22] Filed: Apr. 29, 1976

[30] Foreign Application Priority Data

May 12, 1975 United Kingdom ............... 20490/75

[51] Int. Cl.$^2$ ...................... G11B 21/08; G11B 21/10; G11B 5/82

[52] U.S. Cl. .......................................... 360/78; 360/77; 360/135

[58] Field of Search ...................... 360/78, 77, 131–136

[56] References Cited

U.S. PATENT DOCUMENTS

| | | | |
|---|---|---|---|
| 3,034,111 | 5/1962 | Hoagland | 360/77 |
| 3,534,344 | 10/1970 | Santana | 360/77 |
| 3,691,543 | 9/1972 | Mueller | 360/78 |

*Primary Examiner*—Robert S. Tupper
*Attorney, Agent, or Firm*—R. E. Cummins; R. D. Moss

[57] ABSTRACT

A positioning system for data storage apparatus in which a magnetic transducer is positioned relative to data tracks on a moving record member by means of a closed loop servo system. Improved velocity control information is provided to the servo system by pre-recorded servo tracks read by a single servo head forming part of the closed loop system. Each servo track consists of a plurality of servo cells, alternate ones of which are laterally displaced by half a track width. A position reference signal is prerecorded in each cell at a point which is predetermined to permit the signal to be sensed by the single servo head independently of any other detectable signal. Accordingly, a position error signal derived from displaced cells is always 90° out of phase with the position error signal derived from undisplaced cells. During a track access operation, when the servo head is moved from one track to another track, the displaced and undisplaced cells are sensed by the single servo head to provide two separate position error signals. Control circuits combine selected portions of the two position error signals to provide a composite signal of improved linearity from which the velocity of the head during the access operation can be ascertained directly and employed to perform control functions dependent on velocity.

46 Claims, 19 Drawing Figures

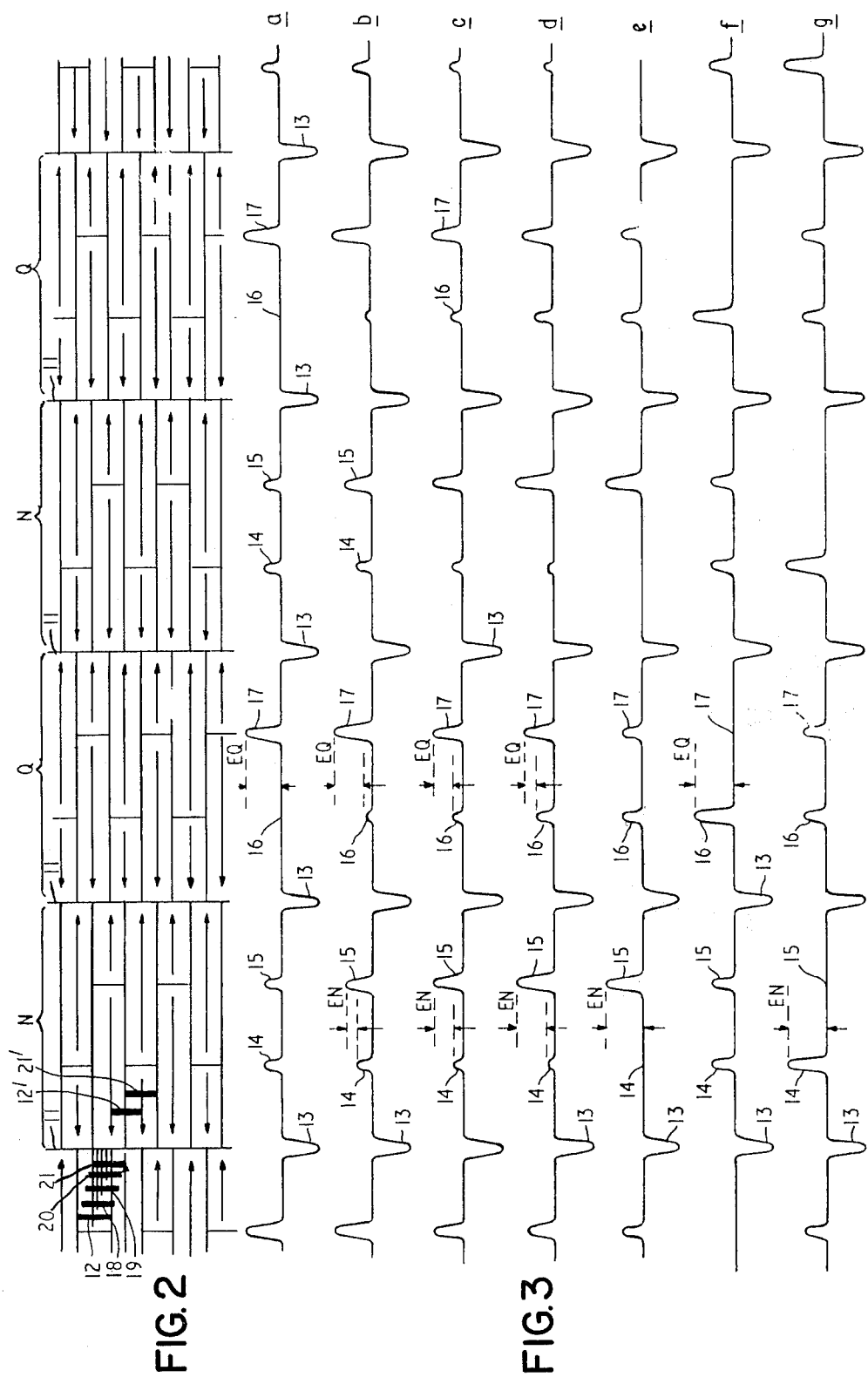

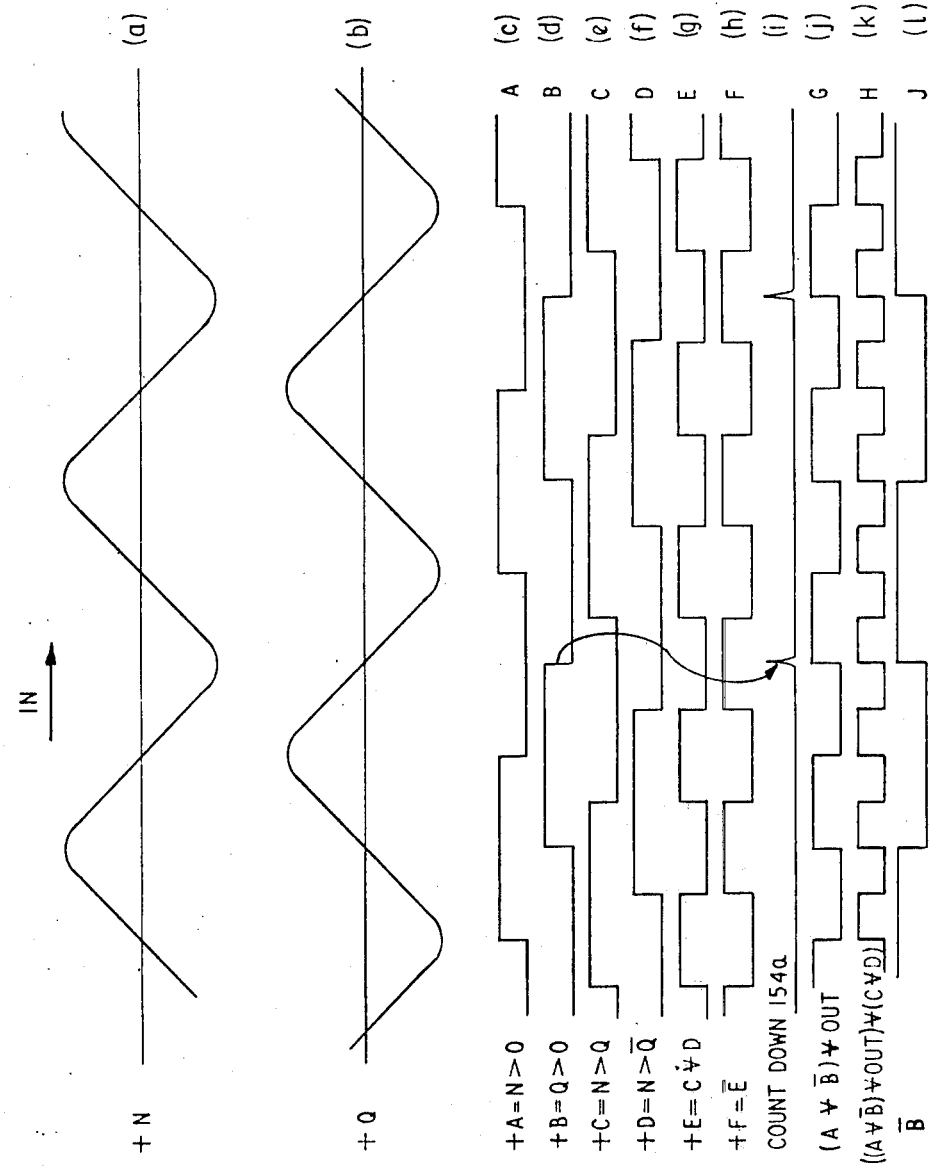

POSITIONING SYSTEM FOR DATA STORAGE APPARATUS AND RECORD MEDIUM FOR USE THEREWITH

BACKGROUND OF THE INVENTION

1. Field of the Invention

The invention relates to a positioning system for positioning a member and to a record medium for use in such a system. The invention also relates to data storage apparatus employing a transducer positioning system.

2. Description of the Prior Art

In U.S. Pat. Nos. 3,534,344 (Santana) and 3,691,543 (Mueller), there are disclosed positioning systems for positioning data transducers to selected tracks on a stack of magnetic recording disks. The data transducers are ganged for movement with a servo transducer which derives position information from servo tracks pre-recorded on one of the recording disks.

The servo tracks in U.S. Pat. No. 3,691,543 are concentric and each consists of relatively long portions of track magnetised in one direction alternating with relatively short portions magnetised in the opposite direction. Magnetic transitions in one of the two directions are aligned from one track to the next and since the tracks are written across the disk surface with no gaps between them, continuous transitions of the same polarity extend radially across the disk surfaces at regularly spaced intervals.

The magnetic transitions in the opposite direction are staggered from one track to the next. In other words, if a section of a track between two continuous transitions (referred to as a servo cell), consists of a relatively long portion followed by a relatively short portion, then the corresponding servo cell on an adjacent track consists of a relatively short portion followed by a relatively long portion and vice-versa. With this arrangement, data heads are said to be on-track when the servo head is centrally located over the boundary, or guidepath as it is called, between two adjacent servo tracks.

If the data head moves off-track, an error signal is developed by the servo head as it moves from its guide path mid-way between adjacent servo tracks to lie more over one track than the other. The magnitude and polarity of the resulting error signal indicates the degree and direction of the off-set of the data head from the on-track position. The servo head and actuator are connected in a closed loop servo system which responds during a track following operation to energize the actuator so as to maintain the data head accurately on-track with zero error signal.

During track accessing operations, the servo error signal alternates in polarity as tracks are crossed and is used to provide track crossing pulses needed to determine the actual position of the data head. An indication of the instantaneous speed of the data head during an access operation is derived from the rate of change of error signal. This is used to control the actuator so that the data head follows a desired velocity profile during an access operation.

Since the error signal in the arrangement described in U.S. Pat. No. 3,691,543 is linear only for about a quarter of a track either side of the on-track position, in practice it is combined with a further signal, also proportional to velocity, obtained from the current supplied to drive the actuator. The combined signals provide a fairly accurate indication of the actual speed of the head during the track access.

In U.S. Pat. No. 3,902,116 (Palmer) there is described an electronic tachometer for generating a continuous velocity output signal from the combination of two quadrature incremental position signals. Such signals are derived from an optical system in which a movable grating on a member to be positioned modulates light transmitted through a fixed grating. The light is detected by two light detectors which are placed so that they produce output signals which are 90° out of phase. The Palmer patent does not show the application of such a scheme to a positioning system in which position reference information is recorded in tracks extending in a direction of intended motion. Nor does the patent show how a single position transducer can provide quadrature position signals in cooperation with an appropriate position reference pattern recorded on a medium.

In some very early transducer positioning systems for disk files such as are described in U.S. Pat. No. 3,034,111 to Hoagland and in an article entitled "Positioning System" by J. O. Hildebrand in the IBM Technical Disclosure Bulletin Vol. 3, No. 11, page 57 (April 1961), there are shown so-called "checkerboard" servo patterns, sections of which may be divided into even and odd sectors, laterally offset from each other by half the width of a square. A servo transducer could be positioned to any row boundary by nulling its output signal. When on a boundary, the servo transducer simultaneously detected equal and opposite magnetic transitions. Great precision was required to record opposite transitions in adjacent tracks in absolute longitudinal alignment so that false position error signals were not generated. Furthermore, to sample and detect the checkerboard transitions, a separate timing track and transducer were required. Offset sections were used to provide positioning at a greater track density, but were not used to produce simultaneous out of phase incremental position signals.

SUMMARY OF THE INVENTION

Accordingly, it is an object of the present invention to provide a new and improved positioning system for positioning a positionable member transversely with respect to a moving record medium.

It is also an object of the invention to provide a new and improved record medium for use as a position reference in such a system which enables generation of two phase displaced position error signals from signals detected by a single transducer.

It is a further object of the invention to provide new and improved data storage apparatus in which a positioning system including a record medium is capable of providing a continuous velocity signal from two phase displaced position error signals detected by a single position transducer.

These and other objects of the invention are achieved by the employment of a record medium having a plurality of contiguous servo tracks of equal width extending across the medium. The tracks are divided into interleaved sections and adjacent sections are laterally offset from each other. Each section of a track contains at least one position reference signal therein which is discrete and separated from signals in adjacent tracks.

By comparing the amplitude of the signals detected by a servo transducer from adjacent tracks, a position error signal indicating offset from the boundary between adjacent tracks may be derived. Since offset sections of the tracks are interleaved, a plurality of such position error signals is generated, one from each section having a unique displacement. These signals are displaced in space phase by an amount dependent on the physical displacement of adjacent sections. They can be differentiated and combined to give a linear velocity signal. They can also be used to position a member to any position intermediate servo track boundaries.

Only a single servo head and servo channel are necessary to derive such signals, the quadrature features deriving from the unique arrangement of position reference signals on the record medium.

As employed in data storage apparatus, a transducer support means, positionable by an actuator, carries both data transducers and a servo transducer in fixed relation thereto. When the servo transducer is positioned to maintain some predetermined relationship between signals detected from adjacent tracks, the data transducers are located exactly over data tracks. Signals from one or more types of section of the servo pattern are employed to preserve this relationship.

The record medium bearing the servo information and the medium bearing the data are either one and the same or else mounted for motion together, such as a plurality of disks on a common spindle. In a track following mode of operation, deviation of the data tracks from the data transducers will be accompanied by a corresponding deviation of the servo information from the servo transducer. This will produce a position error signal which is used to correct the deviation.

In a track access mode of operation, where the transducers are being moved between tracks, the position error signals vary cyclically as tracks are crossed. Since the signals are out of phase, their linear portions can be combined and used to generate a velocity signal.

BRIEF DESCRIPTION OF THE DRAWINGS

The invention will now be described with reference to preferred embodiments thereof as illustrated in the accompanying drawings, in which:

FIG. 2 shows how the servo tracks are encoded according to the invention to provide position information;

FIGS. 3a to 3g show various waveforms detected by a servo head when located in the seven positions shown in FIG. 2;

FIGS. 14a and 14b show the normal and quadrature error signals supplied as inputs to the logic shown in FIG. 13;

FIGS. 14c to 14l show various waveforms generated by the linear region select logic shown in FIG. 13;

Figure 1:
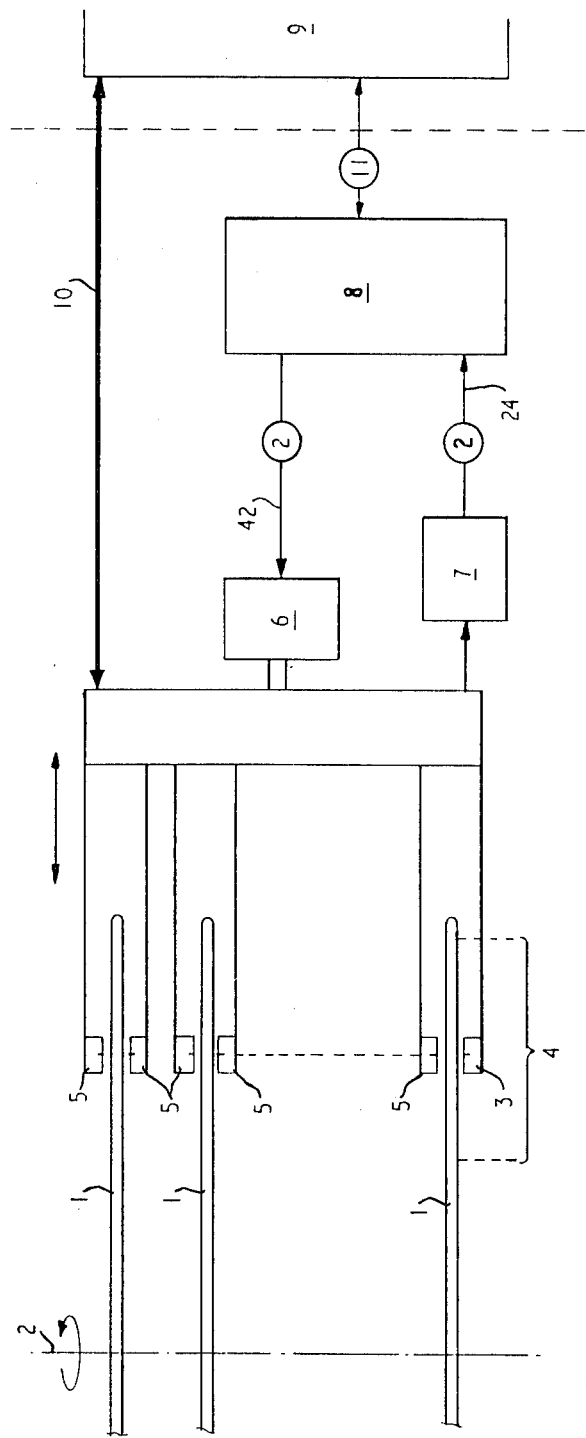
FIG. 1 shows schematically a data storage apparatus incorporating the invention.

Data storage apparatus incorporating the invention is shown schematically in FIG. 1. A stack of magnetic recording disks 1 are mounted for rotation on a central spindle 2. Position information is derived by servo head or transducer 3 reading pre-recorded servo tracks 4 on the associated disk surface. A number of data record and playback heads or transducers 5, one for each of the remaining disk surfaces, are ganged for movement to the servo head 3. The whole head assembly is moved to and fro by actuator motor 6 to enable the data heads 5 to access data tracks, the position of which is defined by the servo head 3 and servo tracks 4.

The position information from the servo head 3 is pre-amplified by pre-amplifier 7 and supplied to servo circuits 8 of the storage apparatus. The function of these circuits, which will be described in detail later, is to provide appropriate drive current for the actuator motor 6 to move the data heads 5 to track addresses specified by external system 9. Since the servo head 3, pre-amplifier 7, the servo circuits 8 and the actuator motor 6 together form a closed loop servo system, the position information is also used to maintain the data heads 5 on track during record and playback operations. During these operations data is transferred between the data heads 5 and the system 9 over data channel 10. In this figure interconnections between units are shown as single lines. The number of actual conductors is shown as a number in a circle associated with the line.

The similarities between the servo pattern of the present invention and the pattern described in U.S. Pat. No. 3,691,543, referred to above, are apparent on inspection of FIG. 2. Thus it is seen that each track consists of long portions magnetised in one direction alternating with short portions magnetised in the opposite direction. The directions of magnetisation are shown as arrows. Magnetic transitions in one of the two possible directions are aligned from one track to the next so that continuous transitions 11 extend radially across the disk. As before, the intervening transitions of opposite polarity are staggered from one track to the next.

The difference between the two patterns is also apparent from the drawing. Whereas in U.S. Pat. No. 3,691,543, the servo pattern consisted of a plurality of continuous concentric servo tracks, in the present invention the servo tracks in a normal servo cell N on one side of a continuous transition 11 are displaced radially by half a track width from the servo tracks in the quadrature servo cell Q on the other side of the transition. Thus a servo head accurately positioned in the on-track position over a guidepath between two adjacent tracks in a normal cell N is completely off-track over the tracks in the displaced or quadrature cell Q.

FIGS. 3a to 3e show waveforms generated in the servo head when in the on-track position with respect to normal cells N and then at positions progressively more off-track until finally (FIG. 3e) it is completely off-track with respect to normal cells and on-track with respect to quadrature cells.

The normal on-track waveform generated by a servo head with its transducing gap in position 12 (FIG. 2) on track with respect to normal servo cells N is shown in FIG. 3a. In this position the servo head produces a negative clock pulse 13 as it enters the first normal cell N. Two normal positive position pulses 14 and 15 follow as the two staggered transitions in adjacent tracks pass the transducing gap of the head. The contributions from these two transitions are equal and the resultant normal pulses 14 and 15 are therefore of equal magnitude and equal to half the magnitude of the negative clock pulse. A further clock pulse 13 is generated as the next continuous transition 11 passes the transducing gap of the head.

A quadrature cell next passes the gap. Since the head is on-track with respect to normal cells it is completely off-track with respect to the quadrature cells and being centrally placed it fails to detect either of the transitions which occur on the tracks on each side of the quadrature cell. The first quadrature position pulse therefore which would appear at 16 is of zero magnitude. In contrast, the whole of the transition occurring in the quadrature track over which the head is centred is sensed producing a second quadrature position pulse 17 of maximum magnitude equal to the magnitude of a negative clock pulse 13. A further clock pulse 13 is generated as the next continuous transition passes the transducing gap followed by two more normal position pulses 14 and 15 of equal magnitude and so on.

The sum of the two position pulses in a servo cell is equal in magnitude to a clock pulse. The difference in magnitude of the normal position pulses EN is indicative of the normal position error of the servo head from the on-track position over a guidepath in a normal cell. Similarly, difference in magnitude of the quadrature position pulses EQ is indicative of the quadrature position error of the servo head from the on-track position over a guidepath in a quadrature cell. In the case illustrated in FIG. 3a EN is zero and EQ is maximum.

The waveform shown in FIG. 3b is that generated by a servo head 3 positioned with its transducing track at 18 (FIG. 2) off-track with respect to a normal cell by approximately a quarter of a track width. Clock pulses 13 are again produced each time a continuous transition passes the servo head. In this case, the contribution from the staggered transitions in the normal cell are not equal since the transducing gap is more over one track than the other. From FIG. 2 it can be seen that normal position pulses 14 will decrease and normal position pulses 15 will increase by a corresponding amount giving rise to a small normal error signal EN.

Since the servo head is now a quarter of a track width nearer the on-track position for quadrature cells, a first quadrature position pulse 16 of small magnitude is generated and a second quadrature position pulse 17 is reduced in magnitude by a corresponding amount. Again, the difference in magnitude of these pulses is indicative of the quadrature position error EQ of the servo head from the quadrature on-track position.

FIG. 3c shows a waveform produced with the transducing gap at 19 (FIG. 2), approximately half a track width from the normal on-track position. Again, the normal position error signal EN increases and the quadrature position error EQ decreases. Since the head is midway between normal and quadrature on-track positions EN and EQ are equal.

FIG. 3d shows a waveform produced with the transducing gap at 20 (FIG. 2) approximately three quarters of a track width from the normal on-track position. The normal position error EN has increased still further and the quadrature position error EQ reduced by a corresponding amount.

FIG. 3e shows the waveform produced with the transducing gap at 21 (FIG. 2) completely off-track with respect to the normal cells N and on-track with respect to the quadrature cells Q. Under these circumstances, the first normal position pulse 14 has disappeared and the second normal position pulse 15 is a maximum, indicating a maximum normal error EN. The quadrature position pulses 16 and 17 are of equal magnitude.

FIG. 3f shows the waveform produced when the servo head has been moved to position 12' to be once again on-track with respect to the normal cells N. The normal position pulses 14 and 15 are of equal magnitude giving zero normal position error EN whilst the quadrature position error EQ at a maximum but of opposite sign to that shown in FIG. 3a.

FIG. 3g shows the waveform produced when the servo head has been moved further in the same direction position 21' to be next on-track with respect to the quadrature cells Q. The quadrature position pulses 16 and 17 are equal in magnitude giving zero quadrature error EQ whilst the normal position error EN is a maximum. As can be seen, the normal position error is of opposite sign to that for the case shown in FIG. 3e. Continual movement of the servo head until it is next on-track with respect to normal cells N produces the same waveform as that shown in FIG. 3a and the cycle is complete. The cycle repeats itself as the servo head continues its access movement in the same direction across the servo tracks.

Figure 4:
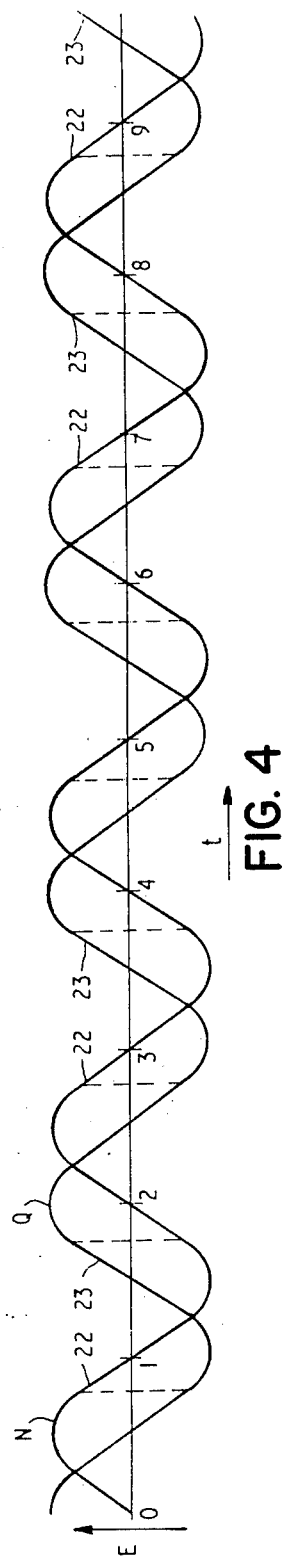
FIG. 4 shows a plot of error voltage against tracks as the servo head moves across tracks during a track access operation.

This is further illustrated in FIG. 4 which shows a plot of error voltage E against tracks t crossed during a constant velocity portion of a track access operation. Two waveforms are shown in the figure. Waveform N is the normal error signal derived from the normal cells and waveform Q is the quadrature error signal derived from the quadrature cells. The situation illustrated is for a track access starting with the data heads in the on-track position over track zero. Under these circumstances, the normal error signal EN is 0 and the quadrature error signal EQ is a maximum. The waveforms show clearly how the error signals change in polarity as tracks are crossed. In this example, the data heads are on track each time the normal error signal EN is zero. It can be seen that the provision of normal and quadrature error signals gives the possibility of doubling the density of the storage apparatus so that data tracks are defined by the servo head when the normal and quadrature error signals are zero.

As in U.S. Pat. No. 3,691,543, the error signals produced in this way are linear only for a quarter of a track on either side of the on-track position. It can be seen from FIG. 4 that the linear portion 22 of the normal waveform N ends when the linear portion 23 of the quadrature waveform Q commences and vice-versa.

Consequently, an accurate indication of velocity of the heads during an access operation can now be derived from the slope of the linear portions of the normal and quadrature error signals.

The operation of the apparatus of the preferred embodiment will now be described and explained with reference to the remaining diagrams. First, a description of the servo circuits 8 (FIG. 1) will be given with reference to the block diagram in FIG. 5.

TRACK ACCESS OPERATIONS

After pre-amplification by pre-amplifier 7, the position error signal is supplied on line 24 to position error detect circuit 25. This circuit detects the negative clock pulses 13 (FIG. 3) and supplies them on line 26 to control the phase locked oscillator (PLO) 27. Under control of gating pulses from the PLO on gating bus 28, the error detect circuit 25 generates a normal error signal N (FIG. 4) on normal output line 29 and a quadrature error signal Q (FIG. 4) on quadrature output line 30. The normal and quadrature error signals are passed on lines 29 and 30 to linear region select logic 31 which provides linear region gating signals at its output. Thus a gating signal representing the linear portion of the normal error signal is generated on line 32 and a gating signal representing the linear portion of the quadrature error signal is generated on line 33. These two signals are used in velocity detect circuit 34 to combine and differentiate the linear portions only of the normal and quadrature error signals supplied as inputs on lines 29 and 30. A voltage representing instantaneous actual velocity $Va$ of the heads is supplied by the velocity detect circuit 34 on output line 35.

In order to control the heads during an access operation, the actual velocity signal $Va$ is compared with a desired velocity signal $Vd$ in comparator 36. The desired velocity $Vd$ is supplied on line 37 from a velocity profile generator 48. The output signal of comparator 36, supplied on line 38, indicates by its polarity whether the heads are moving too fast or too slow with reference to the desired velocity profile. During a seek operation, the TOO-FAST signal is passed by gate 39 over line 40 to driver 41 which is a conventional class B bridge driver. The driver 41 responds to produce drive current of suitable magnitude and polarity on line 42 to energise the actuator motor 6 in such a way as to reduce the differences between the actual and desired velocity signals.

The number of tracks to be crossed in an access operation are calculated by an arithmetic logic unit (ALU) 44 which receives address requests from an external system 9 on address bus 45. Track crossing pulses supplied to the ALU 44 from the linear region select logic 31 on line 46 provide information from which the absolute address of the heads can be calculated. The difference between the desired address and the absolute address, that is, the number of tracks to be crossed in an access operation are supplied by the ALU 44 on bus 47 to the velocity profile generator 48. The output from the ALU 44 on bus 47 is decremented by track crossing pulses during the access operation until it reaches zero indicating that the access is complete. The ALU 44 also indicates on seek line 51 when a seek or access operation is commenced and terminated and further supplies a signal on line 56 which indicates by its polarity whether the destination track is an ODD or EVEN track.

TRACK FOLLOWING OPERATIONS

The normal error signal only is used to control track following operations since it is zero when the heads are accurately located on-track. The normal error signal N is supplied from the position error detect circuit 25 over line 53 to conventional lead/lag compensator 54. The compensated normal error signal is supplied over line 55 and during track following operations is gated by gate 39 to driver 41 which generates appropriate drive current on line 42 for motor 6 to close the servo loop. As will be realized from U.S. Pat. No. 3,691,432, knowledge is required as to whether the track being followed is an odd track or an even track otherwise the position error waveform derived by the servo head is ambiguous. Briefly the reason for this is that displacement from an odd track in one direction gives rise to an error signal of same polarity as that resulting from displacement from an even track in the opposite direction. The odd-/even signal supplied on line 56 from ALU 44 is supplied to the compensator 54 and inverts the error signal should the track being followed be ODD and passes it unchanged should the track being followed be EVEN.

This completes the brief description of the operation of the data storage apparatus incorporating the present invention. A more detailed description of specific parts of the apparatus now follows.

POSITION ERROR DETECT CIRCUIT 25

Figure 6:
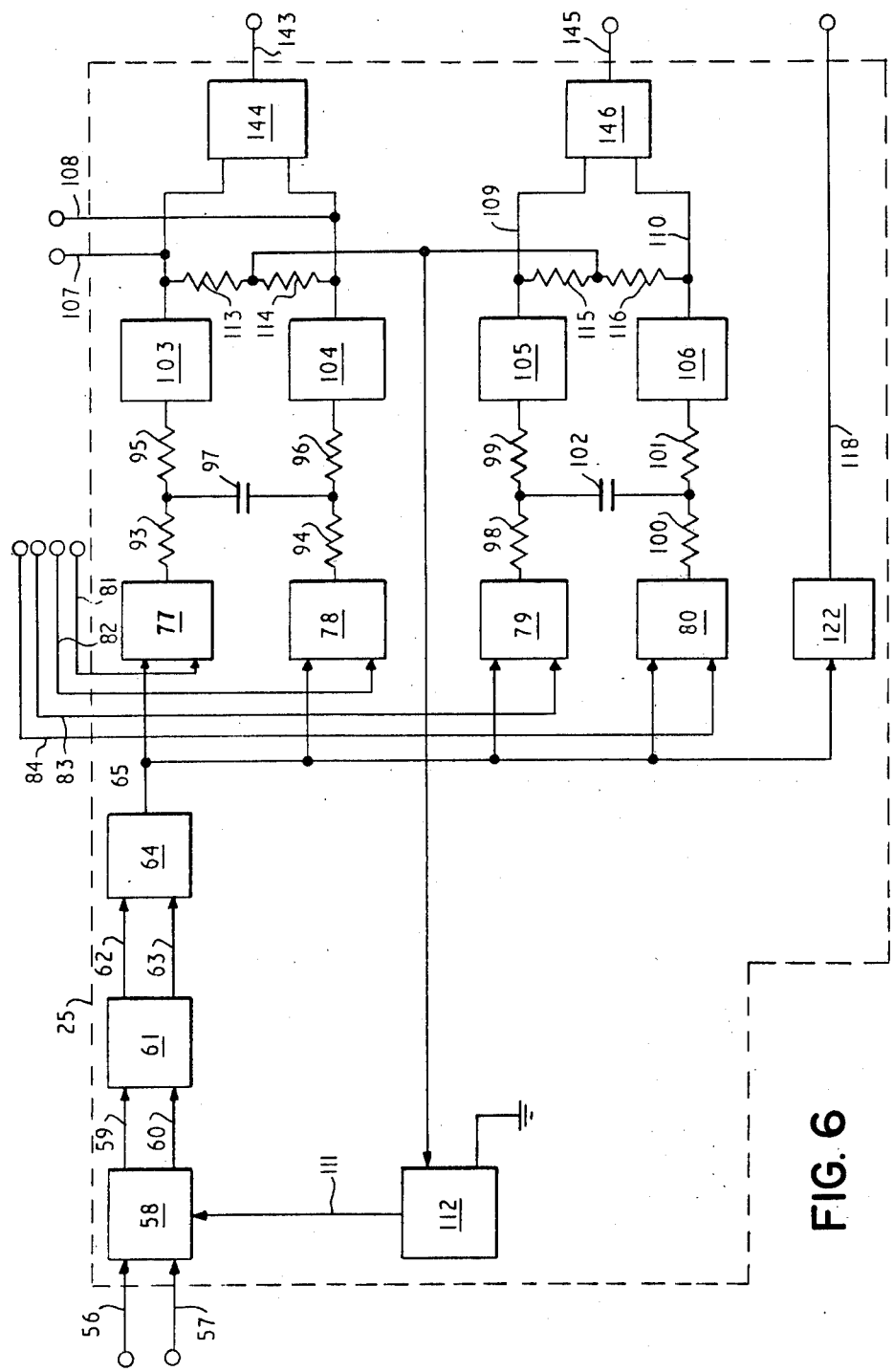
FIG. 6 shows details of the servo position detect circuit of the apparatus shown in FIG. 5.

The Position Error Detect Circuit 25 is shown in FIG. 6. The pre-amplified signals representing the servo pattern derived from the servo head 3 and amplified by pre-amplifier 7 (FIG. 1) are supplied as differential signals on two input lines 56 and 57. Thus, the signal appearing on line 56 is of the type described with reference to FIG. 3. The inverse of this signal occurs simultaneously on line 57. These differential signals are further amplified in variable gain amplifier 58 and passed over lines 59 and 60 to conventional filter 61. This filter removes noise outside the signal band width of about 5MHz and passes the filtered signals to lines 62 and 63. The d.c. level of the signal output on lines 62 and 63 is set at −1.0 volts by baseline control circuit 64 which provides the error signal as a single ended output on line 65. It is convenient at this time to describe the opeation of the base line control circuit before continuing with the description of the position error detect circuit 25.

BASE-LINE CONTROL CIRCUIT 64

Figure 7:
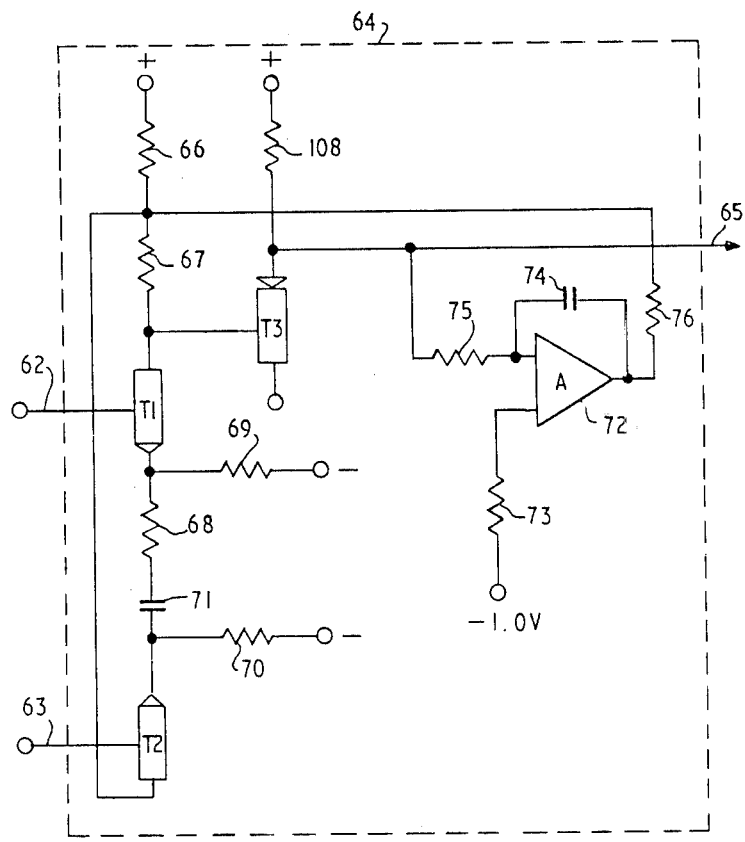
FIG. 7 shows details of the base line control circuit of the apparatus shown in FIG. 6.

Base Line Control Circuit is shown in FIG. 7. The differential filtered signals on lines 62 and 63 are applied to the bases of transistors T1 and T2 which together with the associated resistors 66,67,68,69,70 and capacitor 71, connected as shown, provide a further stage for the differential amplification of the signals. A single output is taken from the collector of transistor T1 and applied to the base of a third transistor T3 which serves as a buffer to obtain a low impedance drive. The establishment of the baseline voltage of −1.0 volt on output line 65 is achieved particularly by operational amplifier 72, one input of which is tied to a −1.0 volt source through resistor 73. The effect of the amplifier 72, capacitor 74 and resistor 75 is to integrate the difference between the input signal and the −1.0 volt reference signal. The integrated signal from the amplifier 72 is fed back to the collector of transistor T2 through resistor 76 and to the collector of transistor T1 through resistors 76 and 67 and is arranged to be of the appropriate value to correct the error in the baseline voltage.

Figure 8:
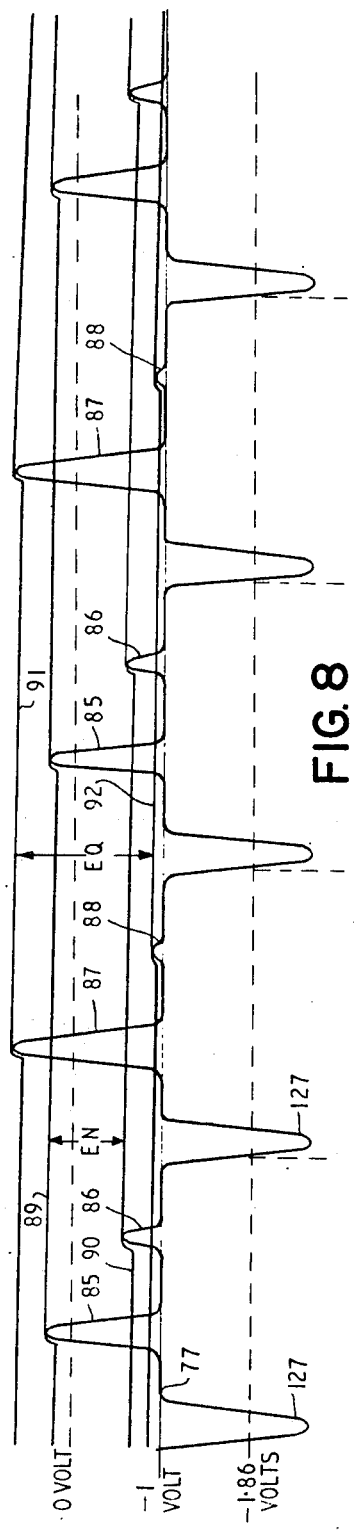
FIG. 8 shows the position error signals derived by the position detect circuit of FIG. 5.

A typical position error signal from the base line control circuit 64 is shown as waveform 77 in FIG. 8. Returning now to FIG. 6, this signal is passed to four demodulators or detectors 77,78,79 and 80 which, under control of gating signals from the PLO 27 (FIG. 5) supplied on gate lines 81,82,83 and 84 gate the position pulses of the waveform 77. Thus, the signal on line 81 coincides with the occurrence of the first position pulse 85 in each normal servo cell, the signal on line 82 coincides with the second position pulse 86 in each normal servo cell and the signals on lines 83 and 84 coincide with the occurrence of the first position pulse 87 and second position pulse 88 respectively in each quadrature servo cell. Each detector is identical and will now be described.

DETECTOR CIRCUITS 77,78,79,80

Figure 9:
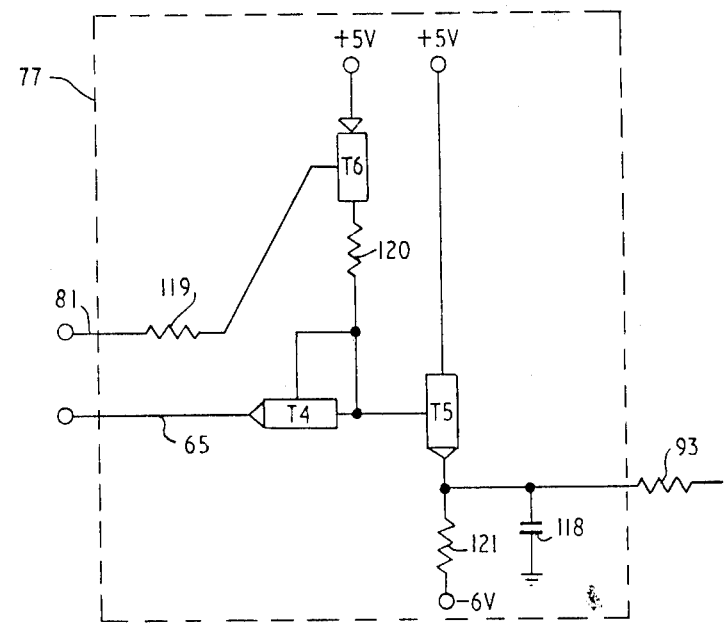
FIG. 9 shows details of a demodulator circuit of the position detect circuit shown in FIG. 6.

A Detector Circuit 77 is shown in FIG. 9 and consists essentially of transistors T4,T5 and T6, capacitor 118 and resistors 119,120 and 121 connected together as shown. The position pulses on line 65 are supplied to the emitter of transistor T4 which, since it has its base strapped, functions as a diode. The gating signals from the PLO are supplied to gate line 81 and when at a down level cause transistor T6 to conduct to gate positive going position pulses, occurring at that time on line 65, through transistor T4 to the base of matched transistor T5. The voltage at the emitter of transistor T5 tries to follow the voltage on the base of transistor T5, resulting in capacitor 118 being charged by the positive position pulse gated to that detector. The R C values of the detector circuit are such that transistor T5 is held off until the arrival of the next positive position pulse gated by transistor T6. The outputs from the four detectors 77,78,79 and 80 are shown in FIG. 8 respectively as waveforms 89,90,91 and 92.

The outputs from detectors 77 and 78 detecting normal position pulses are filtered differentially by resistors 93,94,95 and 96 and capacitor 97 to smooth out the small steps produced when the normal positive peaks of the position signal are stored on the detector capacitors. The values of the filter components are such as to give a roll off differential signal at 16KHz and above. The differentially filtered signals are then passed through buffer circuits 103 and 104 which provide a low impedance drive for the normal error signal which appears as a differential signal on lines 107 and 108. That is, the error signal appearing on line 108 is the inverse of that appearing on line 107. These two signals are converted to a single ended output on line 143 by differential amplifier 144. The signal on this line is the normal error signal N shown in FIG. 4. The normal error signals on lines 107 and 108 are also taken to the compensator 54 for use in controlling track following operations as has been mentioned briefly already and will be described in more detail later.

Similarly the outputs from detectors 79 and 80 detecting quadrature position pulses are filtered differentially by resistors 98,99,100,101 and capacitor 102 and are passed through buffer circuits 105 and 106. The differential quadrature error signal appears on lines 109 and 110. These too are converted to a single ended output by differential amplifier 146 to produce the quadrature error signal Q shown in FIG. 4 on output line 145.

The servo head output and amplifier gain tolerances make it necessary to stabilize the position error detect circuit 25. Variable gain amplifier 58 is therefore provided with an automatic gain control (AGC) voltage input on line 111 supplied from a conventional AGC amplifier and filter 112 which is fed with a reference voltage derived from the output signals from buffers 103,104,105 and 106 and defined by resistors 113,114,115 and 116 to be the mean value of these signals. The position error signal from the base line control circuit 64 is also supplied to a clock detect threshold circuit 122 arranged to detect negative transitions bigger than −1.86 volts.

CLOCK THRESHOLD DETECT CIRCUIT 122

Figure 10:
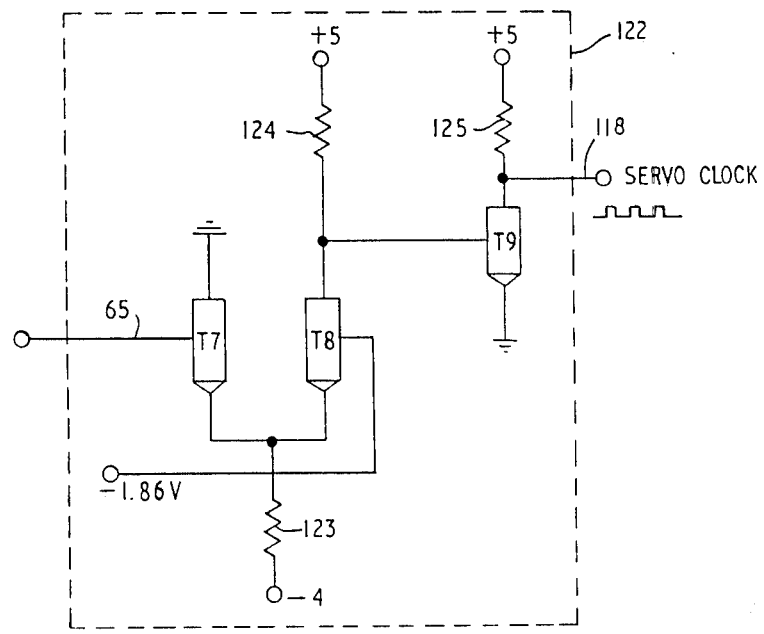
FIG. 10 shows details of the clock detect circuit of the position detect circuit shown in FIG. 6.

This circuit will now be described. The Clock Threshold Detect Circuit 122 is shown in FIG. 10 and consists of transistors T7, T8 and T9 and biasing resistors 123, 124 and 125. Two transistors T7 and T8 are connected in common emitter configuration. A reference signal of −1.86 volts is applied to the base of transistor T7 and the position error signal on line 65 is supplied to the base of transistor T8. Transistor T9 has its base connected to the collector of transistor T8. Whenever the voltage of the position error signal on line 65 falls below −1.86 volts, transistor T8 switches ON and transistor T9 switches OFF. The output is taken from the collector of transistor T9 on line 118 and consists of a number of positive going clock pulses coinciding with the negative clock pulse 127 of the tri-bit position error signal 77 shown in FIG. 8. The servo clock pulses produced by the clock detect circuit 122 are shown as waveform (a) in FIG.12. The waveforms of FIG. 12 have been drawn beneath the position error waveform of FIG. 8 and on the same time scale. This completes the detailed description of the Position Error Detect Circuit.

PHASE LOCKED OSCILLATOR (PLO) 27

Figure 11:
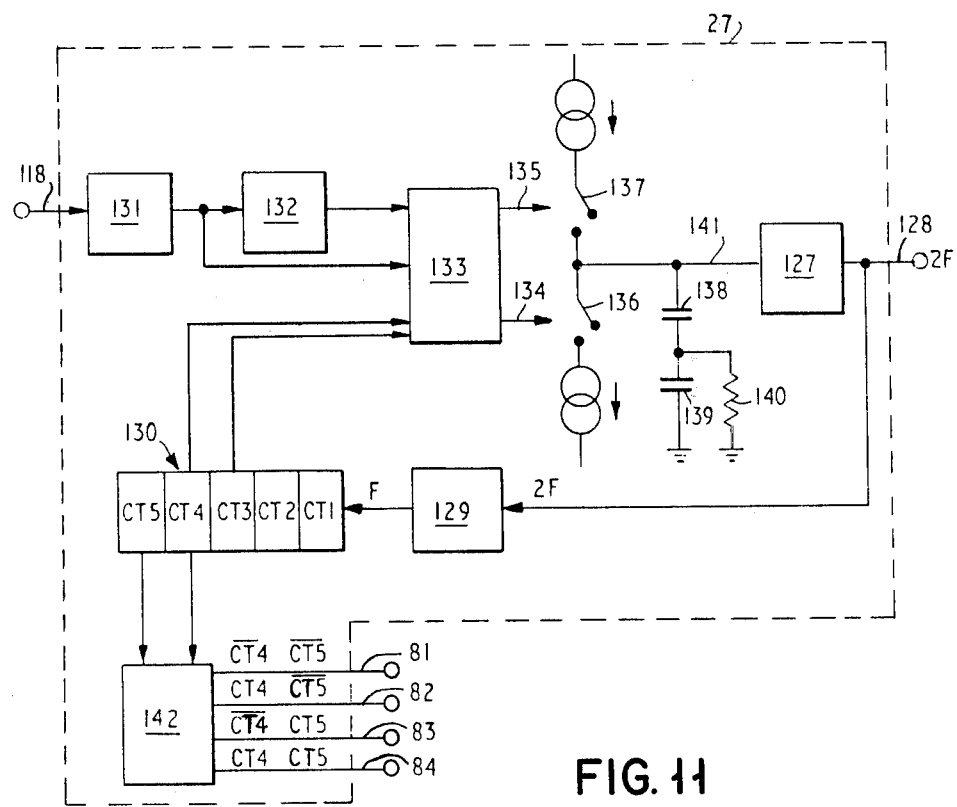
FIG. 11 shows details of the phase locked oscillator forming part of the apparatus shown in FIG. 5.

The Phase Locked Oscillator (PLO) is shown in FIG. 11. The PLO provides the write clocks for the data channel of the storage apparatus and gating signals for the detectors as already described. Basically, the PLO consists of a voltage controlled oscillator 127 which runs at about 16MHz and produces a 2F write clock signal on output line 128. This signal is divided by two by trigger 129 and again by thirty-two by a series of counters CT1, CT2, CT3, CT4 and CT5 shown generally as block 130. The outputs from CT1, CT2, CT3, CT4 and CT5 are shown as waveforms (d) (e) (f) (g) and (h) in FIG. 12 but only the output from counters CT3,CT4 and CT5 are used elsewhere. The output from CT4, waveform (g) is of similar frequency to the servo clock signal shown in waveform (a) which is supplied as a phase reference input to the PLO on line 118. The clock pulses on line 118 supplied to single shot 131 which responds to produce pulses of 600n secs duration which are supplied to clock latch 132. The single shot output is shown as waveform b and the clock latch output as waveform (c) in FIG. 12. The single shot trailing edge is compared with the leading edge of logic state CT3,CT4 in phase compare circuit 133. The comparison is performed by conventional logic techniques and results in an oscillator early signal on line 134 should the oscillator 127 be running too fast with respect to the servo clocks and an oscillator late signal on line 135 should it be running too slow.

The effect of the occurrence of these early and late pulses is represented in FIG. 11 by simple switches. Thus switch 136 is closed when the output pulse from oscillator 127 is early with respect to the clock pulse, and switch 137 is closed when the oscillator output pulse is late. The effect of closing these switches is to produce current flow in the direction shown by the arrows thus decreasing or increasing the voltage on capacitor 138. Capacitor 138 is part of a filter circuit including capacitor 139 and resistor 140. The voltage on output line 141 is used to control the voltage controlled oscillator 127 in a conventional manner.

Figure 12:
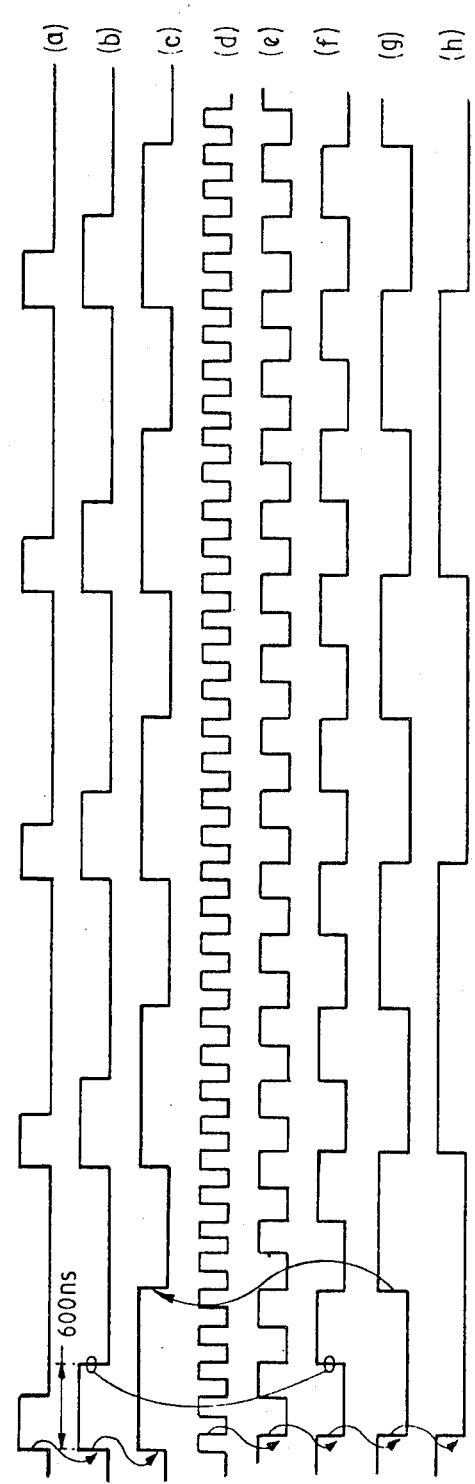
FIGS. 12a to 12c show various waveforms generated to control the operation of the phase locked oscillator shown in FIG. 11.
FIGS. 12d to 12h show various waveforms generated by the phase locked oscillator shown in FIG. 11.

The gating signals supplied to the detectors (FIG. 6) on lines 81, 82, 83 and 84 are obtained by logically combining the outputs from the PLO counters. Logical combinations of the CT4 and CT5 outputs shown as waveforms (g) and (h) respectively in FIG. 12 provide the four unique conditions required to gate the four detector circuits. A logic block 142 receives CT4 and CT5 signals and produces the four possible logic combinations on the four output lines 81, 82, 83 and 84 to the detectors. Thus the gating pulse on line 81 to detector 77 to gate the first normal position pulse of each normal cell is derived from the logic combination $\overline{CT4} \cdot \overline{CT5}$; the gating pulse on line 82 to gate the second normal pulse is derived from the logic combinations $CT4 \cdot \overline{CT5}$; and the gating pulse on line 84 to gate the second quadrature pulse is derived from the combination $CT4 \cdot CT5$. This completes the description of the construction and operation of the PLO 27.

LINEAR REGION SELECT LOGIC 31

Figure 13:
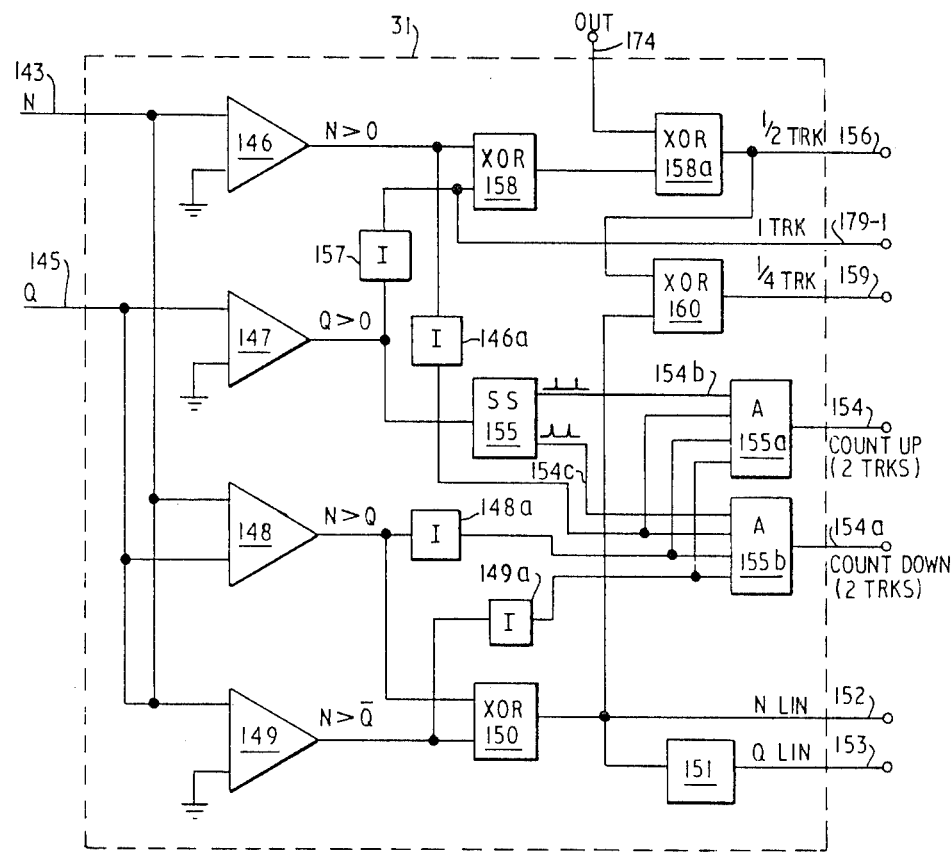
FIG. 13 shows the linear region select logic forming part of the apparatus shown in FIG. 5.

The linear Region Select Logic is shown in FIG. 13 with the normal error signal N (FIG 4) as one input on line 143 and the quadrature error signal Q as the other input on line 145. In order to facilitate the description of the logic, the normal N and quadrature Q error signals are shown separately in FIG. 14 as waveforms $a$ and $b$ respectively with logic conditions at various points in the linear region select logic shown below in waveforms $c$ to $k$. The relationship of the normal and quadrature error signals depends upon the direction of access across the disk surface. Movement towards the disk spindle is shown in the figure by an arrow marked IN. This is in the direction of decreasing track number since in this apparatus track zero is nearest the disk spindle. From the figure it can be seen that with an inward move, the normal signal N is phase advanced by $\pi/2$ with respect to the quadrature error signal Q. A logic signal 174 representing the direction in or out, of the movement is generated by the Arithmetic Logic Unit (ALU) 44, to be described later.

The normal error N is compared with ground in amplifier 146 to generate a logic output +A representing the condition $N > 0$. This condition is shown in waveform $c$ of FIG. 14. The quadrature error signal Q is compared with ground in amplifier 147 to generate a logic output +B representing the condition $Q > 0$. This condition is shown in waveform $d$ of FIG. 14. The normal error N and quadrature error Q are compared with each other in amplifier 148 to generate a logic output +C representing the condition $N > Q$. This condition is shown in waveform $e$. The sum of the two error signals are compared with ground in amplifier 149 to generate a logic output +D representing the condition $(N+Q) > 0$ which may be written $N > \overline{Q}$. This condition is shown in waveform $f$.

The linear region of the normal error signal N is obtained as logic output +E from exclusive OR (XOR) 150 supplied with inputs from amplifiers 148 and 149. The logic output, +E on output line 152 representing the condition C ∀ D is shown in waveform $g$. The linear region of the quadrature error signal Q is obtained by inverting the output from XOR 150 in inverter 151. The logic output +F from inverter 151 on output line 153 representing the condition $\overline{E}$ is shown as waveform $h$. Track crossing pulses are derived from single shot 155 which is triggered by the front and back edges of the logic output +B from amplifier 147. The pulses from the front edge of +B appear on line 154$b$, and from the back edge on line 154$c$. The track crossing pulses are timed to occur midway between each on-track position of the data head.

Lines 154$b$ and 154$c$ are fed to 'and' gates 155$a$ and 155$b$ respectively. Logic signals A, C and D as mentioned above are inverted by invertors 146$a$, 148$a$ and 149$a$ respectively. The outputs of these three invertors are also fed to 'and' gates 155$a$ and 155$b$. These two 'and' gates serve to gate out every other track crossing pulse such that pulses occur on lines 154 and 154$a$ every two tracks. The gating is such that pulses will occur only on line 154 if the arm is moving away from the spindle and only on line 154$a$ if the arm is moving towards the spindle. This arrangement ensures that the absolute address register 170 described later keeps accurate account of the arm position, even in the presence of incorrect logic commands.

Three other logic waveforms giving position information are also generated by the linear region select logic. The first is logic output +J representing the condition $\overline{B}$ which is obtained by inverting the output from amplifier 147 in invertor 157. The signal changes once every track and is known as the 1 track signal on output line 179-1. The second is logic output +G representing the condition (A ∀ $\overline{B}$) ∀ OUT which is obtained on output line 156 by supplying the one track signal together with the signal from amplifier 146 to exclusive OR 158, and supplying the output of 158 and the out signal 174 to a second XOR 158$a$. This logic signal changes state every half track with respect to the normal signal N and is called the half track signal.

The third logic waveform is logic output +H representing the condition ((A ∀ $\overline{B}$) ∀ OUT) ∀ (C ∀ D)) which is obtained on output line 159. This signal is shown in waveform $k$ and changes state every quarter of a track. It is therefore known as the quarter track signal and is obtained by supplying the half track signal XOR 158$a$ together with N linear region signal from XOR 150 as inputs to XOR 160. The function of the quarter, half, and one track signals will be described later.

VELOCITY DETECT CIRCUIT 34

Figure 15:
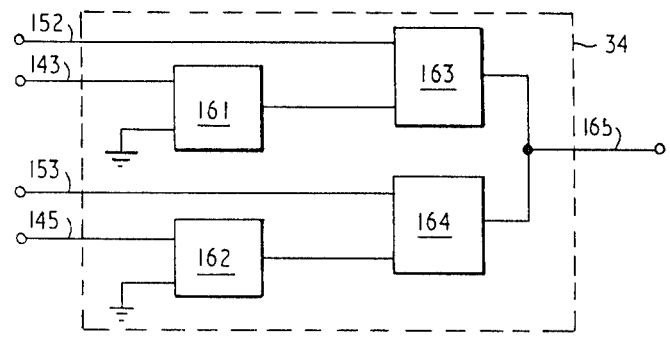
FIG. 15 shows details of the velocity detect circuit forming part of the apparatus shown in FIG. 5.

The velocity detect circuit 34 is shown in FIG. 15. The normal error signal N on line 143 from the Position Error Detect Circuit 25 is differentiated and rectified in differentiator and rectifier 161. This may be of the type described in International Business Machines Technical Disclosure Bulletin, Volume 16 No. 5, Oct. 1973 page 1669 in which case one input terminal would be connected to ground. The linear portion of the differentiated and rectified normal error signal is gated on output line 165 by AND - gate 163 under control of the N linear region signal on line 152 from linear select logic 31.

Similarly the quadrature error signal Q on line 145 is differentiated and rectified in differentiator and rectifier 162 and the linear portion gated on output line 165 by AND-gate 164 under control of the Q linear region signal on line 153. The output from the two AND - gates 163 and 164 are dot ORed and supplied as a voltage on line 165 the magnitude of which is proportional to the actual velocity Va of the heads during an access operation.

ARITHMETIC LOGIC UNIT 44

Figure 16:
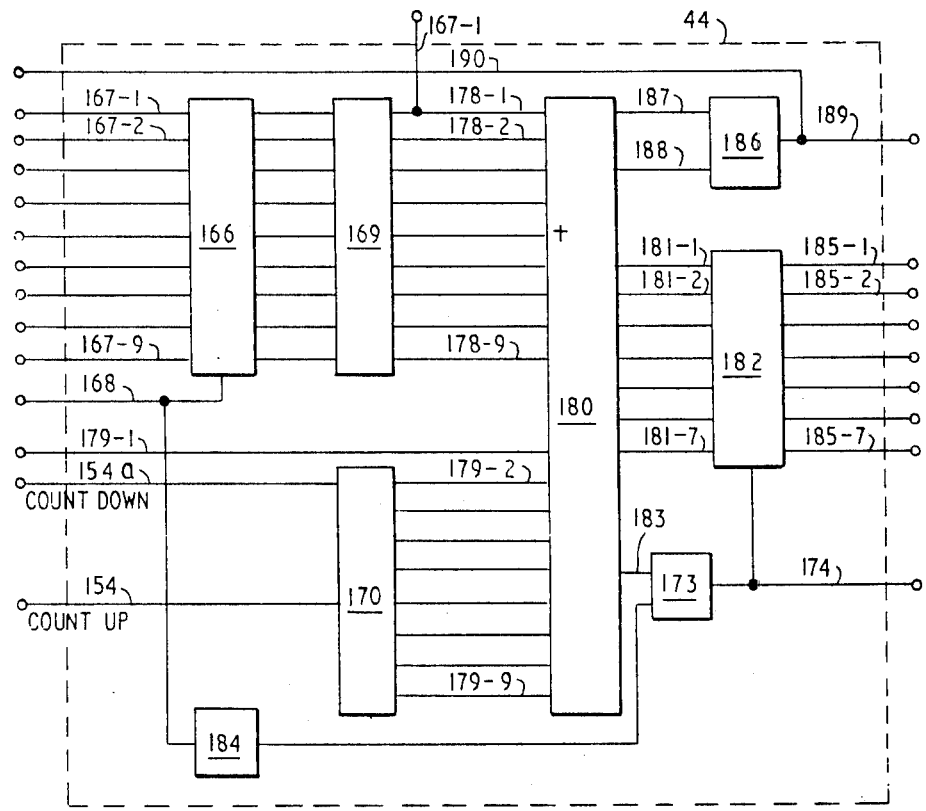
FIG. 16 shows details of the arithmetic logic unit forming part of the circuit shown in FIG. 5.

The Arithmetic Logic Unit (ALU) 44 is shown in FIG. 16. Desired track addresses are supplied to the storage apparatus on address bus 45 (FIG. 5) which consists of nine bit lines 167-1 to 167-9 and a load line 168. A load pulse on line 168 opens gate 166 to store the desired address of the access operation in address register 169. This register stores the desired address until the access is completed at which time it may be cleared.

The absolute address of the heads is held in counter 170 which is incremented or decremented depending on whether the access is away from the disk spindle in the direction of increasing track number or towards the disk spindle. Count pulses are supplied every two tracks on input line 154 from the linear region select logic 31 if the movement is away from the disk spindle, and on line 179-1 if the movement is towards the disk spindle (i.e., IN).

The least significant bit representing 1 track is supplied directly from the one track signal on line 179-1 from the linear region select logic.

The output from address register 169 on lines 178-1 to 178-9 representing the desired address and the output from up-down counter 170 on lines 179-2 to 179-9 and the one track signal on line 179-1 are supplied to arithmetic unit 180. This unit subtracts the absolute address on lines 179 from the desired address on lines 178 to determine the number of tracks to be crossed during the current access operation. The number of tracks in the access are supplied on output lines 181-1 to 181-7 to inverting gate 182.

In the case of a request for an outward seek, that is, an access from a track with a low track number to a track with a higher track number, the output from arithmetic unit 180 will be the true difference and represents the actual number of tracks to be crossed. There will be no carry signal on carry line 183 to flip-flop 173. The load pulse on line 168 is supplied to flip-flop 173 after a suitable delay in delay circuit 184 to cause the flip-flop 173 to sample the state of the carry line 183. In the absence of a carry pulse on line 183, the output from flip-flop 173 goes UP providing the OUT-pulse on line 174 used in the linear region select logic 31. The up-level of the OUT pulse on line 174 to invert gate 182 has no effect on the gate and the inputs on lines 181 are transferred to the output lines 185-1 to 185-7 unchanged.

A request for an inward seek that is an access from a track of higher track number to one of lower track number will result in the complement of the actual number of tracks to be crossed appearing on output line 181 together with a carry pulse on carry line 183. The presence of the carry pulse on line 183 when flip-flop 173 is sampled causes the output from the flip-flop to go DOWN. The down level of the OUT-pulse on line 174 to invert gate 182 generates the inverts of the inputs lines on lines 181 on the output lines 185. Thus the output from invert gate 182 always gives the actual number of tracks to be crossed during an access operation.

The arithmetic logic unit 44 also contains a seek latch 186 which is set by pulse on set line 187 which is up whenever the output from the arithmetic unit 180 is other than zero and is re-set by a pulse on reset line 188 when the access operation is complete, that is, when the output from the unit 180 returns to zero. In the set state, latch 186 produces a seek signal on output line 189 and used elsewhere in the apparatus (FIG. 18) and also returned on line 190 to the external system to indicate when a seek operation is completed.

VELOCITY PROFILE GENERATOR 48

Figure 17:
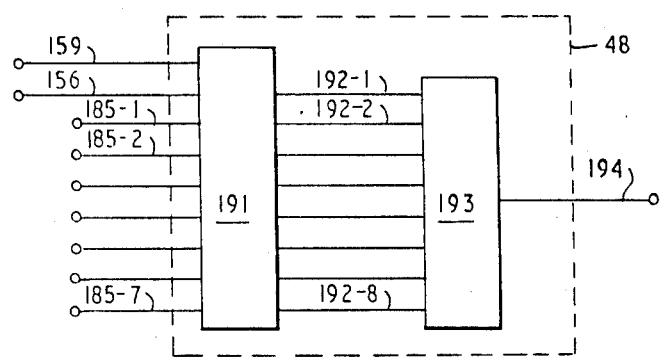
FIG. 17 shows details of the velocity profile generator forming part of the circuit shown in FIG. 5.

The Velocity Profile Generator 48 is shown in FIG. 17. It consists of a read-only store (ROS) 191, which stores the desired velocity profile in digital form. Digital signals representing the number of remaining tracks in an access are supplied from the ALU 44 on lines 185 as previously described. The half track signal and quarter track signal from the linear region select logic 31 are supplied on lines 156 and 159 respectively as inputs to the ROS 191. These inputs to the ROS 191 enable it to be decremented every quarter track. Thus, if necessary, the desired velocity can be changed every quarter track ensuring a smooth velocity profile for the access mechanism.

The digital output from ROS 191 on lines 192 is converted to an analogue signal by conventional digital-to-analogue converter 193. This signal on line 194 represents the desired velocity Vd and is compared with the actual velocity Va in comparator 36. The output from the comparator on line 38 (FIG. 5) is binary and has already been mentioned is called the TOO-FAST signal. An UP-level of this signal indicates that the actual velocity Va is greater than the desired velocity Vd, that is the heads are moving too fast and a DOWN-level indicates that the actual velocity Va is less than the desired velocity. The TOO-FAST signal on line 38 is supplied to gate 39.

GATE 39

Figure 18:
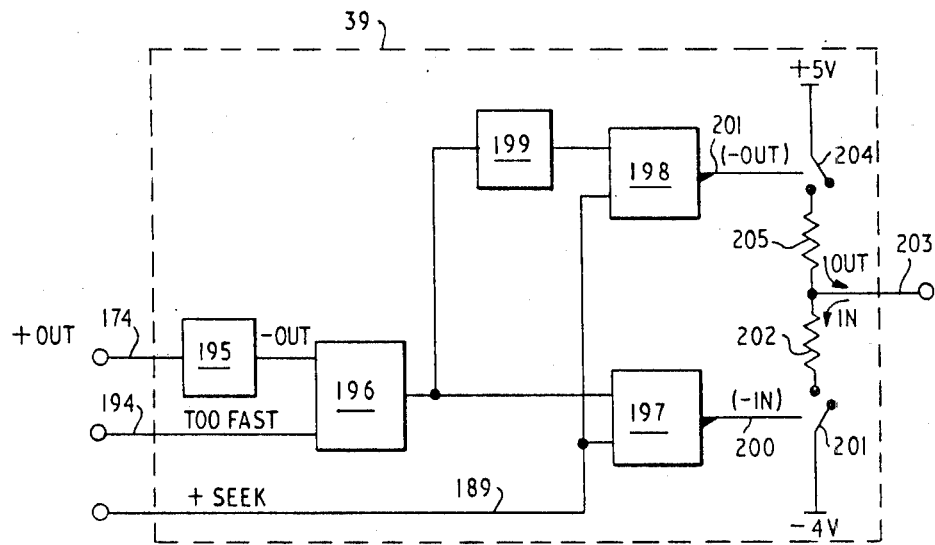
FIG. 18 shows the gate forming part of the circuit shown in FIG. 5.

Gate 39 is shown in FIG. 18 and controls by means of the Seek signal on line 189 whether the actuator performs a track access or a track following operation. The signal on line 194 from the comparator indicating by its level whether the heads are moving too fast or too slow is supplied as one input to exclusive OR 196. The signal on line 174 from the ALU, indicating by its level whether an IN or OUT seek is being performed, is inverted by inverter 195 and supplied as second input to XOR 196. The output from XOR 196 is connected directly as input to inverting AND-gate 197 and as input to inverting AND-gate 198 after inversion by inverter 199. The other input to AND-gates 197 and 198 is the seek pulse on line 189 from the ALU. When the input conditions for AND-gate 197 are met, its output on line 200 is at a down-level closing switch 201 and causing driver current to flow in drive line 203 (equivalent to line 40 in FIG. 5) through resistor 202 in the direction of the arrow marked IN. As this implies, drive current in this direction to the driver 41 (FIG. 5) energises the actuator so as to tend to move the heads towards the spindle in an IN direction. Similarly, when the input conditions for AND-gate 198 are met, switch 204 is closed and OUT current flows in the opposite direction through drive line 203 and resistor 205 to drive the heads away from the spindle.

A truth table for the four possible input conditions is shown below in order to clarify the operation of the gate 39.

| DIRECTION OF SEEK | CONDITION | XOR i/ps | 196 o/p | DRIVE CURRENT ON 203 |
|---|---|---|---|---|
| OUT (174 UP) | TOO FAST (194 UP) | ≠ | UP | IN |
| OUT (174 UP) | TOO SLOW (194 DOWN) | — | DOWN | OUT |
| IN (174 DOWN) | TOO FAST (194 UP) | — | DOWN | OUT |
| IN (174 DOWN) | TOO SLOW (194 DOWN) | ≠ | UP | IN |

During a track following operation the Seek line to gate 39 is down and no drive current is generated in either direction on line 203. Under these circumstances, the normal error signal from the position detect circuit 25 is used to control the driver 41 to maintain the heads accurately on-track in a conventional manner.

COMPENSATOR 54

Figure 19:
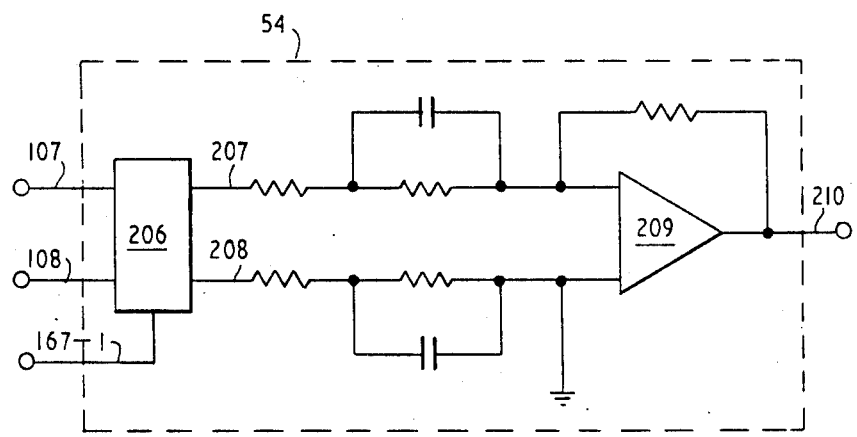
FIG. 19 shows the compensator forming part of the circuit shown in FIG. 5.

The compensator circuit is shown in FIG. 19. The normal error signal appearing as a differential signal on lines 107 and 108 (FIG. 6) are supplied as inputs to a switchable analogue inverter 206. As has already been explained and is fully described in U.S. Pat. No. 3,691,543, the significance of the error signal depends on whether an odd or an even track is being followed. The information is derived from the first bit of the address of the track to be followed, that is, the track access requested by the external system, supplied to the desired address register 169 (FIG. 16) or input bus 167-1. This signal is supplied as control to inverter 206 to ensure that the error signals emerging on lines 207 and 208 are of the correct polarity for track following.

Figure 5:
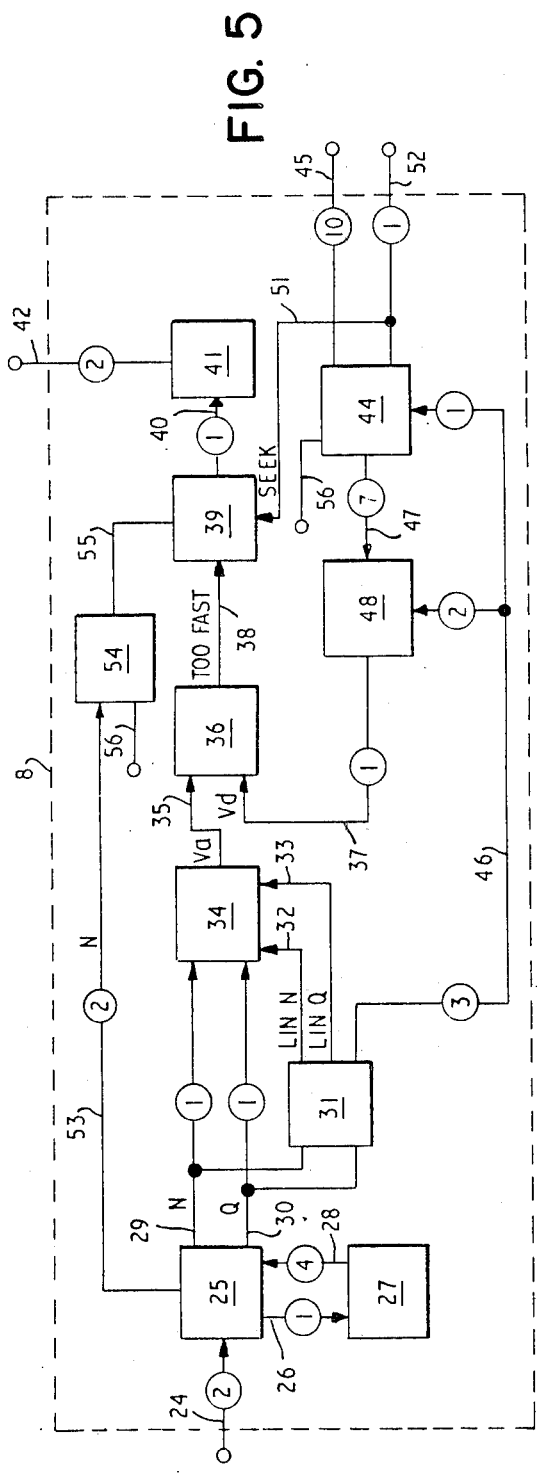
FIG. 5 shows the servo electronics of FIG. 1 in more detail.

The remainder of the circuit is a conventional lead-/lag compensator using an operational amplifier 209 which converts the differential position error signal appearing on lines 207 and 208 into a single ended output on output line 210 either positive or negative as required by the driver circuit 41 (FIG. 5). Track following signals are always present at the compensator output but during seek operations these are swamped by the much larger signals also appearing on output line 203 from gate 39.

As has already been mentioned earlier in the specification, the encoded tri-bit servo pattern used in the description of the preferred embodiment of the invention is not intended to be a limitation of the invention. To a person skilled in the art, it will be apparent that other encoded servo patterns such as the di-bit patterns described in the above referred to U.S. Pat. No. 3,543,344 may be used in place of the tri-bit pattern. Also these patterns need not be in the form of changing magnetic states but may be encoded for example by optical means.

Further, the apparatus described in the preferred embodiment employs magnetic recording disks as the storage medium. It will be apparent that the invention is equally applicable to other storage mediums such as elongated webs and drums. For this reason, it should be understood that the term "longitudinal" as employed in the accompanying claims is not restricted to a linear dimension but is also intended to cover the circumferential dimension of concentric tracks.

What is claimed is:

1. A positioning system for positioning a positionable member transversely with respect to a moving record medium, comprising:
   a positionable member; a position transducer mounted on said positionable member;
   actuator means coupled to said positionable member for positioning said positionable member in response to actuator control signals supplied to said actuator means;
   a record medium;
   and means defining a predetermined path of movement for said record medium;
   said record medium having a plurality of contiguous position reference tracks of equal width recorded thereon, extending in the direction of movement of said record medium;
   said position reference tracks being divided longitudinally into a plurality of interleaved sections, each section being laterally displaced with respect to its immediately adjacent sections by a distance of less than one track width, and each sectional portion of each track having recorded thereon at least one position reference signal, detectable by said position transducer, which signal is not contiguous with any other transducer detectable signal on said record medium;
   said system further comprising control circuit means connected to receive signals detected by said transducer from said position reference tracks, said control circuit means being responsive to said detected signals to derive at least one actuator control signal therefrom and being connected to apply said at least one actuator control signal to said actuator means.

2. A positioning system according to claim 1 wherein said position transducer has a sensitive width equal to said position reference track width and said control circuit means comprises.
   first differential comparison means for deriving the difference in amplitude of signals detected by said transducer from position reference signals in adjacent tracks in like sections, said difference in amplitude constituting a first position error signal;
   second differential comparison means for deriving the difference in amplitude of signals detected by said transducer from said position reference signals in adjacent tracks in like displaced sections, said difference in amplitude constituting a second position error signal;
   said actuator control signal being dependent upon the value of at least one of said position error signals.

3. A positioning system according to claim 2 wherein said control circuit means comprises
   a velocity signal generating circuit for differentiating said first and second position error signals and for combining selected portions of said differentiated position error signals to form a velocity signal indicative of the velocity of said positioning member.

4. A positioning system according to claim 3 which is selectively operable in a track following mode, in which mode said first position error signal is applied alone to control said actuator to so position said positionable member as to null said first position error signal.

5. A positioning system according to claim 3 which is selectively operable in a track access mode to move said positionable member so as to carry said transducer to a predetermined position reference track, said first and second position error signals varying cyclically as said tracks are crossed, and
> wherein said control circuit means further comprises a track crossing signal generator responsive to at least one of said first and second position error signals to indicate when said tracks are crossed.

6. A positioning system according to claim 5 wherein said control circuit means comprises a reference velocity signal generating circuit responsive to track crossing signals from said track crossing signal generator to generate a reference velocity signal indicating a predetermined desired velocity of said positionable member at different positions during its movement between tracks, and
> a velocity error signal generator for generating a velocity error signal indicative of the difference between said velocity signal and said reference velocity signal, said velocity error signal being applied to said actuator as a control signal during said access mode.

7. A positioning system according to claim 1 wherein said lateral displacement is equal to half a track width.

8. A positioning system according to claim 7 wherein each of said position reference track sections is bounded by a plurality of longitudinally aligned transducer detectable signals extending laterally across all of said tracks.

9. A positioning system according to claim 8 wherein each of said sections is the same length and is of one of two alternating types,
said position reference signals bearing a fixed longitudinal relationship with said section bounding signals and with each other.

10. A positioning system according to claim 9 wherein
said record medium is magnetic and
said section bounding signals are transitions from a first state of magnetisation to a second,
each sectional portion of each track having recorded thereon only a single transition between said second state of magnetisation and said first, constituting one of said position reference signals.

11. A positioning system according to claim 10 wherein
said record means comprises a disk and said position reference tracks are concentric with the center of said disk.

12. A positioning system for positioning a positionable member transversely with respect to a moving record medium having a plurality of contiguous position reference tracks of equal width recorded thereon, extending in the direction of movement of said record medium;
> each of said tracks being divided longitudinally into a plurality of first and second sections, each of said first sections being laterally offset with respect to its immediately adjacent second sections by a distance of less than one track width, and each of said sections having recorded thereon at least one position reference signal at a predefined point in said section, to permit said signal to be sensed independently of any other transducer detectable signal on said record medium; said system comprising:
> a single position transducer adapted to sense each of said position reference signals;
> means coupled to said position transducer for moving said transducer from a first position to a second position in response to control signals supplied thereto;
> control circuit means connected to said transducer for receiving signals detected by said transducer from said position reference tracks,
> said control circuit means comprising
> means for deriving first and second incremental position signals from position reference signals detected by said transducer in said first and second sections respectively, said incremental position signals being displaced in phase by an amount dependent upon said lateral offset and varying cyclically as said tracks are crossed during said movement;
> a velocity signal generating circuit for deriving from linear portions of said first and second incremental position signals
> a velocity signal indicative of the velocity of said transducer;
> a velocity error signal generator for generating a velocity error signal indicative of the difference between said velocity signal and a reference velocity signal; and
> means connected to apply said velocity error signal to said moving means to control the velocity thereof during said movement.

13. A positioning system according to claim 12 wherein
said means for deriving first and second incremental position signals comprises first differential comparison means for deriving said first incremental position signal from the difference in amplitude of signals detected by said transducer from position reference signals in adjacent tracks in said first section, and
second differential comparison means for deriving said second incremental position signal from the difference in amplitude of signals detected by said transducer from position reference signals in adjacent tracks in said second section.

14. A positioning system according to claim 12 for use with a record medium whose first and second sections are laterally offset by half a track width so that said first and second incremental position signals are in quadrature relationship,
> said velocity signal generating circuit including means for differentiating and rectifying said incremental position signals;
> means for indicating linear quadrants of each of said signal and
> means for combining those portions of said differentiated and rectified position signals corresponding to said linear quadrants to form a continuous velocity signal.

15. Data storage apparatus comprising:
record means on which data can be stored;
means defining a predetermined path of movement for said record means;
at least one data transducer for transferring data between said record means and external apparatus during movement of said record means in said predetermined path;
transducer support means for carrying said data transducer between different transducing positions relative to said record means;
actuator means for positioning said transducer support means in response to actuator control signals;

and a servo transducer, supported by said transducer support means at a fixed position relative to said at least one data transducer;

said record means having a plurality of contiguous servo tracks of equal width thereon, extending in the direction of said predetermined path of said record means past said servo transducer, said servo tracks being divided longitudinally into a plurality of interleaved sections, each section being laterally displaced with respect to its immediately adjacent sections by a distance of less than one track width, and each sectional portion of each track having recorded thereon at least one transducer detectable position reference signal which is not contiguous with any other transducer detectable signal on said record means, said apparatus further comprising control circuit means connected to receive signals detected by said servo transducer from said servo tracks, said control circuit means being responsive to said detected signals to derive at least one actuator control signal and being connected to apply said at least one actuator control signal to said actuator means.

16. Data storage apparatus according to claim 15 wherein said servo transducer has a sensitive width equal to said servo track width and said control circuit means comprises first differential comparison means for deriving the difference in amplitude of signals detected by said servo transducer from said position reference signals in adjacent tracks in like sections, said difference in amplitude constituting a first position error signal;

second differential comparison means for deriving the difference in amplitude signals detected by said servo transducer from said position reference signals in adjacent tracks in like displaced sections, said difference in amplitude constituting a second position error signal;

said actuator control signal being dependent upon the value of at least one of said position error signals.

17. Data storage apparatus according to claim 16 wherein said control circuit means comprise a velocity signal generating circuit for differentiating said first and second position error signals and for combining selected portions of said differentiated position error signals to form a velocity signal indicative of the velocity of said transducer support means.

18. Data storage apparatus according to claim 17 which is selectively operable in a track following mode, in which mode said first position error signal is applied alone to control said actuator to so position said transducer support means member as to null said first position error signal.

19. Data storage apparatus according to claim 17 which is selectively operable in a track access mode to move said transducer support means member so as to carry said servo transducer to a predetermined track, said first and second position error signals varying cyclically as said tracks are crossed, and wherein said control circuit means further comprises a track crossing signal generator responsive to at least one of said first and second position error signals to indicate when said tracks are crossed.

20. Data storage apparatus according to claim 19 wherein said control circuit means comprises a reference velocity signal generating circuit responsive to track crossing signals from said track crossing signal generator to generate a reference velocity signal indicating a predetermined desired velocity of said transducer support means at different positions during its movement between tracks, and a velocity error signal generator for generating a velocity error signal indicative of the difference between said velocity signal and said reference velocity signal, said velocity error signal being applied to said actuator as a control signal during said access mode.

21. Data storage apparatus according to claim 15 wherein said lateral displacement is equal to half a track width.

22. Data storage apparatus according to claim 21 wherein each of said servo track sections is bounded by a plurality of longitudinally aligned transducer detectable signals extending laterally across all of said servo tracks.

23. Data storage apparatus according to claim 22 wherein each of said sections is the same length and is of one of two alternating types, said position reference signals bearing a fixed longitudinal relationship with said section bounding signals and with each other.

24. Data storage apparatus according to claim 23 wherein said record medium is magnetic and said section bounding signals are transitions from a first state of magnetisation to a second, each sectional portion of each track having recorded thereon only a single transition between said second state of magnetisation and said first, constituting one of said position reference signals.

25. Data storage apparatus according to claim 24 wherein said record means comprises a disk and said servo tracks are concentric with the center of said disk.

26. Data storage apparatus comprising a plurality of magnetic disk records;

a spindle upon which said disk records are mounted for rotation therewith;

a plurality of data transducers for reading data recorded on said disk records at least one servo transducer for detecting servo information in a plurality of servo tracks of equal width recorded concentrically on one of said disk records associated with said servo transducer;

transducer support means supporting said data and servo transducers in fixed positional relationship;

and actuator means coupled to said transducer support means for positioning said transducer support means radially of said disk records;

each said servo track storing servo information in the form of transitions from one magnetic state to another along its length, alternate transitions from one magnetic state to another being aligned with corresponding transitions along adjacent tracks, intervening transitions being staggered from one track to the next, and tracks on one side of aligned transitions being laterally displaced from tracks on the other side by a distance of less than one track width;

said apparatus further comprising control circuit means connected to receive servo signals detected by said servo transducer from said servo tracks, said control circuit means being responsive to said detected servo signals to derive at least one actuator control signal and being connected to apply said at least one actuator signal to said actuator means.

27. Data storage apparatus according to claim 26 wherein said lateral displacement is equal to half a track width and wherein said aligned transitions occur at equally spaced intervals along the medium and define servo cells of alternating type therebetween.

28. Data storage apparatus according to claim 27 wherein said servo transducer has a sensitive width equal to said servo track width and said control circuit means comprises first differential comparison means for deriving the difference in amplitude of signals detected by said servo transducer from said staggered transitions in adjacent tracks in cells of one type, said difference in amplitude constituting a first position error signal;

second differential comparison means for deriving the difference in amplitude of signals detected by said servo transducer from said staggered transitions in adjacent tracks in cells of the alternate type, said difference in amplitude constituting a second position error signal;

said actuator control signal being dependent upon the value of at least one of said position error signals.

29. Data storage apparatus according to claim 28 wherein said control circuit means comprise a velocity signal generating circuit for differentiating said first and second position error signals and for combining selected portions of said differentiated position error signals to form a velocity signal indicative of the velocity of said transducer support means.

30. Data storage apparatus according to claim 29 which is selectively operable in a track following mode, in which mode said first position error signal is applied alone to control said actuator to so position said transducer support means member as to null said first position error signal.

31. Data storage apparatus according to claim 29 which is selectively operable in a track access mode to move said transducer support means so as to carry said servo transducer to a predetermined track, said first and second position error signals varying cyclically as said tracks are crossed, and wherein said control circuit means further comprises a track crossing signal generator responsive to at least one of said first and second position error signals to indicate when said tracks are crossed.

32. Data storage apparatus according to claim 31 wherein said control circuit means comprises a reference velocity signal generating circuit responsive to track crossing signals from said track crossing signal generator to generate a reference velocity signal indicating a predetermined desired velocity of said transducer support means at different positions during its movement between tracks, and a velocity error signal generator for generating a velocity error signal indicative of the difference between said velocity signal and said reference velocity signal, said velocity error signal being applied to said actuator as a control signal during said access mode.

33. A record medium for use in a positioning system, said medium having a plurality of contiguous position reference tracks of equal width recorded thereon extending in a direction of intended motion past a position transducer, said tracks being divided longitudinally in the direction of motion into a plurality of interleaved sections, each section being laterally displaced with respect to its immediately adjacent sections by a distance of less than one track width, and each sectional portion of each track having recorded thereon at least one discrete transducer detectable position reference signal which is not contiguous with any other transducer detectable signal on said medium.

34. A record medium according to claim 33 wherein said lateral displacement is equal to half a track width.

35. A record medium according to claim 34 wherein said position reference tracks include at least one plurality of longitudinally aligned transducer detectable signals extending laterally across all of said servo tracks.

36. A record medium according to claim 35 wherein each of said sections is bounded by a plurality of longitudinally aligned transducer detectable signals extending laterally across all of said tracks.

37. A record medium according to claim 36 wherein each of said sections is the same length and is of one of two alternating types, said position reference signals bearing a fixed longitudinal relationship to said section bounding signals and to each other.

38. A record medium according to claim 37 wherein said medium is magnetisable and said section bounding signals are transitions from a first state of magnetisation to a second, each sectional portion of each track having additionally recorded thereon only a single transition between said second state of magnetisation and said first, which single transitions constitute said position reference signals.

39. A record medium according to claim 38 wherein said record medium is disk shaped and said position reference tracks are concentric with the center of said disk.

40. A magnetisable record for use in positioning a position servo transducer in data storage apparatus, said medium having a plurality of magnetic servo tracks of equal width recorded thereon extending in a direction of intended motion of the medium past such a servo transducer, the magnetisation of each track changing state at intervals to produce a repetitive sequence of identical patterns of magnetisation along its length, alternate magnetic transitions along a track being aligned with corresponding transitions along adjacent tracks, intervening transitions being staggered from one track to the next and tracks on one side of said aligned transitions being sideways displaced from tracks on the other side by a distance less than one track width.

41. A magnetisable record medium according to claim 40 in which said aligned transitions occur at equally spaced intervals along said medium and in which said intervening transitions occur at equally spaced intervals along each said track.

42. A magnetisable record medium according to claim 39 wherein said tracks on one side of said aligned transitions are sideways displaced from tracks on the other side of said aligned transitions by a distance equal to half a track width.

43. A record medium for use in a positioning system, said medium having a plurality of transducer detectable position information signals recorded thereon in a pattern defining a plurality of paths of relative motion in a common direction between said medium and such a transducer, each of said signals being physically separate from every other transducer detectable signal on said medium;
- said position information signals including first and second groups of signals lying respectively in alternate laterally contiguous bands of equal width extending longitudinally in said direction of relative motion,
- said first and second groups of signals having a fixed longitudinal displacement from each other, and
- said position information signals further including third and fourth groups of signals also lying respectively in alternate laterally contiguous bands of the same equal width extending longitudinally in said direction of motion,
- said third and fourth groups of signals having a fixed longitudinal displacement from each other and from said first and second groups of signals,
- said bands in which said first and second groups of signals lie being laterally displaced by less than the width of one band from said bands in which said third and fourth groups of signals lie.

44. A record medium according to claim 43 in which said lateral displacement is equal to half the width of one band.

45. A record medium according to claim 44 which is magnetisable and in which each of said position information signals is a transition from a first to a second state of magnetization,
- said servo pattern further including longitudinally aligned magnetic transitions from said second to said first state,
- pairs of said aligned transitions alternately bracketing a plurality of longitudinally aligned position information signals of said first type with a plurality of longitudinally aligned position information signals of said second type, and bracketing a plurality of longitudinally aligned transitions of said third type with a plurality of longitudinally aligned transitions of said fourth type.

46. A record medium according to claim 45 which is disk shaped, said laterally contiguous bands of position information signals being concentric with said disk.

* * * * *